(12) United States Patent
Wegerer et al.

(10) Patent No.: US 11,091,704 B2
(45) Date of Patent: *Aug. 17, 2021

(54) INTEGRATION OF PRESSURE SWING ADSORPTION WITH HYDROCRACKING FOR IMPROVED HYDROGEN AND LIQUIDS RECOVERY

(71) Applicant: UOP LLC, Des Plaines, IL (US)

(72) Inventors: David A. Wegerer, Lisle, IL (US); Bradley P. Russell, Wheaton, IL (US); Gautam Pandey, Gurgaon (IN); Wim F. Elseviers, Ghent (BE)

(73) Assignee: UOP LLC, Des Plaines, IL (US)

( * ) Notice: Subject to any disclaimer, the term of this patent is extended or adjusted under 35 U.S.C. 154(b) by 331 days.

This patent is subject to a terminal disclaimer.

(21) Appl. No.: 16/256,702

(22) Filed: Jan. 24, 2019

(65) Prior Publication Data

US 2019/0225895 A1    Jul. 25, 2019

Related U.S. Application Data

(60) Provisional application No. 62/622,031, filed on Jan. 25, 2018.

(51) Int. Cl.
*C10G 59/02* (2006.01)
*B01D 53/04* (2006.01)
(Continued)

(52) U.S. Cl.
CPC ........... *C10G 59/02* (2013.01); *B01D 53/047* (2013.01); *B01D 53/0462* (2013.01); *B01D 53/229* (2013.01); *B01D 53/75* (2013.01); *B01D 53/9431* (2013.01); *C01B 3/02* (2013.01); *B01D 53/002* (2013.01); *B01D 2253/104* (2013.01); *B01D 2253/106* (2013.01);
(Continued)

(58) Field of Classification Search
CPC .......................... B01D 53/002; B01D 53/0462; B01D 53/047; B01D 53/229; B01D 53/75; B01D 53/9431; C10G 2300/1044; C10G 2400/02; C10G 59/02
USPC ...................................... 95/96, 136
See application file for complete search history.

(56) References Cited

U.S. PATENT DOCUMENTS

2008/0072752 A1* 3/2008 Kumar ............... B01D 53/0476
95/103
2010/0011955 A1* 1/2010 Hufton ...................... C01B 3/32
95/136

(Continued)

*Primary Examiner* — Sharon Pregler
(74) *Attorney, Agent, or Firm* — Paschall & Associates, LLC; Mark Goldberg

(57) ABSTRACT

The invention provides a process for producing hydrogen for a hydrogen consuming process comprising obtaining a net gas stream containing hydrogen, compressing the gas stream to a pressure of 20.7 to 68.9 bar (300 to 1000 psig) to produce a compressed gas stream; sending the compressed gas stream to a pressure swing adsorption unit to be separated into a hydrogen stream and a fuel gas stream; purging the pressure swing adsorption unit with an external purge gas stream from a hydroprocessing unit off gas; treating the off gas with a thermal swing adsorption unit to remove water and other impurities prior to purging the pressure swing adsorption unit, and using a protective adsorbent layer in the pressure swing adsorption unit to adsorb impurities from the external purge gas.

16 Claims, 1 Drawing Sheet

(51) Int. Cl.
  *C01B 3/02* (2006.01)
  *B01D 53/047* (2006.01)
  *B01D 53/22* (2006.01)
  *B01D 53/94* (2006.01)
  *B01D 53/75* (2006.01)
  *B01D 53/00* (2006.01)
(52) U.S. Cl.
  CPC .... *B01D 2253/108* (2013.01); *B01D 2256/16* (2013.01); *B01D 2256/24* (2013.01); *B01D 2257/108* (2013.01); *B01D 2257/304* (2013.01); *B01D 2257/406* (2013.01); *B01D 2257/7022* (2013.01); *B01D 2257/7025* (2013.01); *B01D 2257/80* (2013.01); *C10G 2300/1044* (2013.01); *C10G 2400/02* (2013.01)

(56) References Cited

U.S. PATENT DOCUMENTS

2013/0205828 A1* 8/2013 Sethna .................. F25J 3/0257
                                                          62/607
2019/0224612 A1* 7/2019 Russell ................ B01D 53/047

* cited by examiner

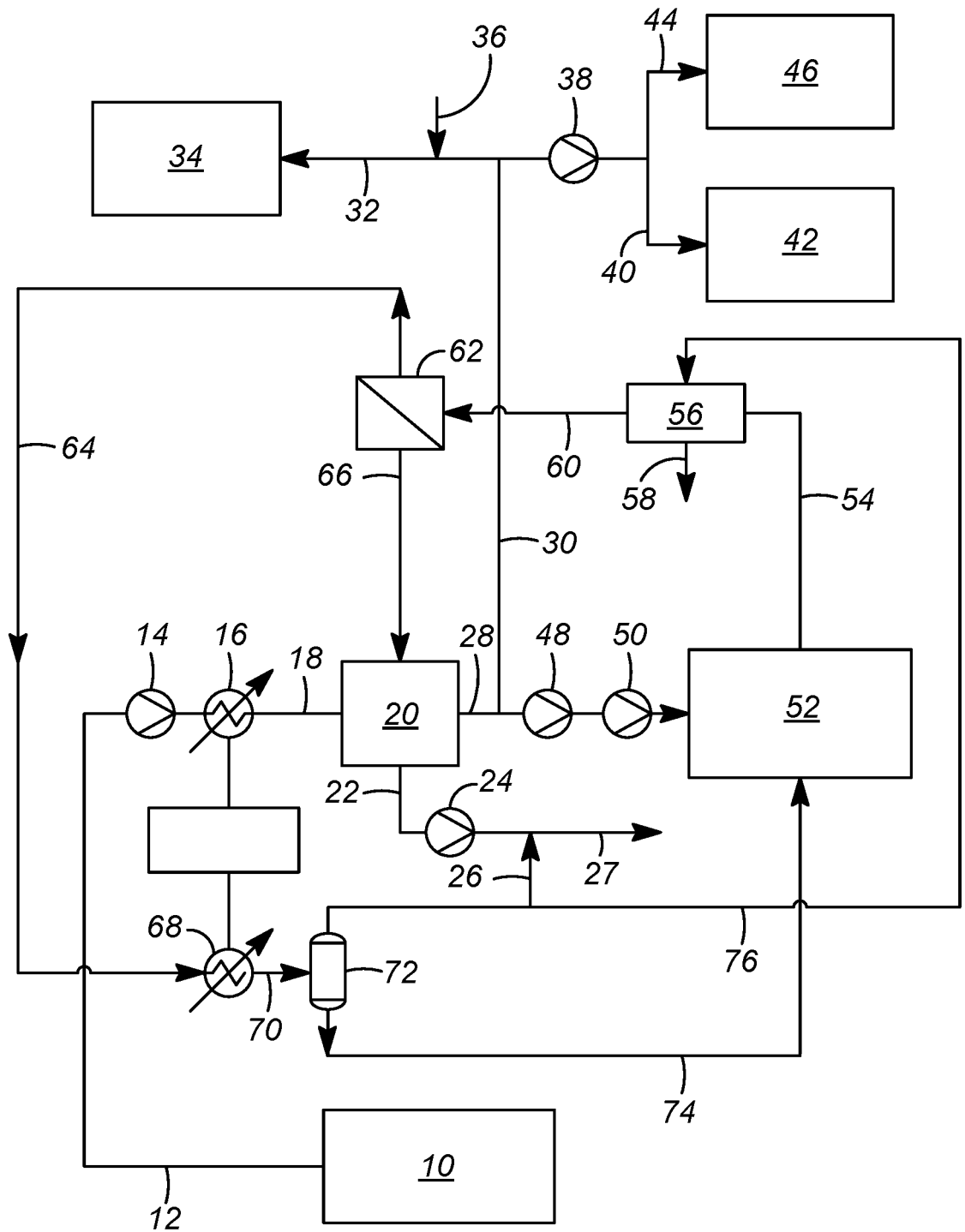

INTEGRATION OF PRESSURE SWING ADSORPTION WITH HYDROCRACKING FOR IMPROVED HYDROGEN AND LIQUIDS RECOVERY

This application claims priority from Provisional Application No. 62/622,031 filed Jan. 25, 2018, the contents of which are hereby incorporated by reference.

BACKGROUND OF THE INVENTION

The present invention provides a process for improving hydrogen recovery as well as the overall economics of a reactor complex that includes multiple reactors utilizing hydrogen.

Hydrocracking is a hydroprocessing process in which hydrocarbons crack in the presence of hydrogen and a hydrocracking catalyst to lower molecular weight hydrocarbons. Depending on the desired output, a hydrocracking unit may contain one or more beds of the same or different catalyst. Hydrocracking can be performed with one or two hydrocracking reactor stages. In single stage hydrocracking, only a single hydrocracking reactor stage is used. Unconverted oil may be recycled from the product fractionation column back to the hydrocracking reactor stage. In two-stage hydrocracking, unconverted oil is fed from the product fractionation column to the second hydrocracking reactor stage. Slurry hydrocracking is a slurried catalytic process used to crack residue feeds to gas oils and fuels.

Due to environmental concerns and newly enacted rules and regulations, saleable fuels must meet lower and lower limits on contaminants, such as sulfur and nitrogen. New regulations require essentially complete removal of sulfur from diesel. For example, the ultra-low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

A hydroprocessing recovery section typically includes a series of separators in a separation section to separate gases from the liquid materials and cool and depressurize liquid streams to prepare them for fractionation into products. Hydrogen gas is recovered for recycle to the hydroprocessing unit. A stripper for stripping hydroprocessed effluent with a stripping medium such as steam is used to remove unwanted hydrogen sulfide from liquid streams before product fractionation.

In addition, in many plants there are additional units that employ hydrogen to further convert hydrocarbons as needed.

Efficient use of hydrogen is critical to the economics of a hydroprocessing unit. In current projects there is a continued need for higher efficiencies. For example, in a complex that consists of a hydrocracking unit, catalytic reforming unit, and aromatics unit that is not including a pressure swing adsorption (PSA) unit, it is desirable to reduce both capital and operating expenses by reducing equipment count and by integrating process operations to improve efficiency.

Sometimes, the complex containing several individual units is offered with a PSA unit to derive pure hydrogen (99.9 mol %) that is used as make-up gas to the hydrocracking unit. This PSA unit is typically fed with catalytic reforming net gas at 300 to 400 psig and produces a hydrogen product at a recovery rate of 85 to 90%. Due to the high value of hydrogen, a method is needed to increase hydrogen recovery from the PSA unit. The overall economics of the complex is sensitive to hydrogen balance/utilization, and it has been found that increasing PSA hydrogen recovery can have a significant benefit.

This invention is intended to improve hydrogen balance across the complex and importantly increase the value of the overall complex by including a PSA unit in the make-up gas compression system of the hydrocracker. Operating this PSA unit at a significantly higher pressure (500 to 1000 psig) increases hydrogen recovery by-3 to 6 percentage points, thereby improving overall economics of the complex. In addition to improved hydrogen recovery, the higher pressure also provides an opportunity to eliminate booster compressors associated with other units in the complex and reduce equipment count. This invention can also be applied to other types of hydroprocessing units.

SUMMARY OF THE INVENTION

The invention involves a process for producing hydrogen for a hydrogen consuming process comprising obtaining a net gas stream containing hydrogen, compressing the gas stream to a pressure of at least 300 psig to produce a compressed gas stream; sending the compressed gas stream to a pressure swing adsorption unit to be separated into a hydrogen stream and a fuel gas stream; purging the pressure swing adsorption unit with an external purge gas stream from a hydroprocessing unit off gas; treating the external purge gas stream with a thermal swing adsorption unit to remove water and other impurities prior to purging the pressure swing adsorption unit; and using a protective adsorbent layer in the pressure swing adsorption unit to adsorb impurities from the external purge gas. The external purge gas stream may be a flash gas stream from a hydrocracking reactor or from a hydrotreating reactor. The net gas stream may be from a catalytic reforming reactor. The external purge gas stream may be at a pressure of about 5 psig to 40 psig when entering the pressure swing adsorption unit. The hydrogen that is produced is sent to one or more reactors selected from the group consisting of a hydrocracking reactor, a hydrotreating reactor, an aromatics conversion reactor, and an isomerization reactor. The treated purge gas stream is sent through a membrane unit to produce a non-permeate stream depleted in hydrogen and a permeate hydrogen stream to be sent as said external purge gas stream through said pressure swing adsorption unit. The process treated purge gas stream may be at a pressure of about 200 to 600 psig.

The temperature swing adsorption unit may be regenerated with a gas stream from the non-permeate hydrocarbon stream. The protective adsorbent layer comprises from about 5% to 25% of said pressure swing adsorption unit bed volume and is located at a product hydrogen end of the adsorption bed. The protective adsorbent layer may comprise silica gel or activated alumina. The non-permeate stream is chilled to about 0 to 20° C. to produce a liquid hydrocarbon stream which is typically sent to fractionation section of a hydroprocessing unit to recover liquefied petroleum gas.

BRIEF DESCRIPTION OF THE DRAWING

The FIGURE shows a flow scheme of the present invention.

DETAILED DESCRIPTION OF THE INVENTION

As shown in the FIGURE, the flow scheme of the present invention uses cold, low-pressure flash gas (LP off-gas) from the hydrocracker to improve PSA performance. This gas, which would otherwise be exported from the hydrocracker as fuel or would be mixed with other refinery off-gas streams for purification in a separate, stand-alone PSA unit, is used to improve performance of the main, integrated hydrocracker PSA unit. As indicated in the diagram, the LP off-gas stream that is flashed from the hydrocracker is first treated in a thermal swing adsorption (TSA) unit in order to remove water and trace levels of ammonia and hydrogen sulfide. The dried LP flash gas (at 320 psig) then goes to a membrane unit, where most of the hydrogen (~85%) is recovered in low-pressure (25 psig) permeate, and hydrocarbons are rejected in the non-permeate. This purified hydrogen (99+ mol %) is mixed with an internal purge gas generated in the main PSA unit and provides two benefits: (1) increases overall amount of purge, and (2) reduces internal purge losses. The net result is an increase of PSA hydrogen recovery from catalytic reformer net gas and a significant decrease in PSA bed volume (and therefore cost). The membrane non-permeate is chilled to about 45° F. using an integrated chiller, and most of the C3+ hydrocarbons are recovered as liquid. This small liquid stream is separated into LPG and light naphtha cuts in the hydrocracking fractionation section.

Advantages of the new scheme include the following: (1) hydrogen recovery from catalytic reformer net gas increases and (2) condensate from membrane non-permeate provides additional LPG and light naphtha revenue streams. Unique features of this PSA design compared to prior art include: (1) mixing of external purge gas into the existing, internal provide-purge (PP) header, and (2) use of a silica gel or activated alumina layer at the product hydrogen end of the bed as a guard layer. Prior art hydrogen PSA units make use of multiple adsorbents arranged in layers to remove specific contaminants and adsorbent layer order in the direction of feed flow is a critical design specification. A molecular sieve adsorbent, for example, calcium A (5A) or sodium X (13X) type zeolite, is typically the ultimate adsorbent layer in prior art H2 PSA adsorber beds. The function of the silica gel or activated alumina guard layer is to adsorb residual contaminants, such as water, ammonia, hydrogen sulfide, and C2+ hydrocarbons introduced at the product hydrogen end of an adsorber bed via the external purge gas, thereby protecting the molecular sieve adsorbent from trace levels of contaminants. Without this silica gel or activated alumina protective layer, these trace contaminants will deactivate the molecular sieve adsorbent. Deactivation occurs by irreversible adsorption of trace contaminants, thereby reducing adsorption capacity for the main impurities from PSA feed gas, such as methane and may result in PSA unit shutdown and adsorbent replacement. The silica gel or activated alumina guard layer at the product hydrogen end of an adsorber serves to adsorb trace contaminants from the external purge gas and then desorb these contaminants into the main PSA product stream at high pressure. Thus, contrary to normal PSA practice, impurities swing from a low-pressure stream (external purge gas) to a high-pressure stream (PSA product). Table 1 shows an example of possible impurity levels of the external purge stream entering the PSA unit.

TABLE 1

Composition of External Purge Gas (99.4 mol % Hydrogen)

| | Concentration, ppmv |
|---|---|
| Methane | 5,000 |
| Ethane | 300 |
| Propane | 200 |
| Butanes | 70 |
| Pentanes | 20 |
| Water | 10 |
| Ammonia | 5 |
| Hydrogen Sulfide | 2 |

The total purge stream that is used to purge an adsorber bed in the PSA cycle is comprised of: (1) internal purge gas, and (2) external purge gas. According to normal practice, the internal purge gas is most commonly obtained from de-pressurizing an adsorber bed in the PSA unit from a high pressure to a lower pressure. This de-pressurization step is typically the final co-current depressurization step in the cycle, and is commonly referred to as the provide-purge (PP) step. The external purge gas from the membrane is mixed with the internal purge gas. The flow rate of external purge gas is measured, and the amount of internal purge gas is adjusted in the PSA control program so as to obtain a desired total amount of purge. This desired total amount of purge gas is adjusted so that the volumetric purge: feed ratio is in the range of 1.0 to 2.0, preferably 1.2 to 1.8. The relative amounts of external purge and internal purge in this total purge gas ranges from 40% external/60% internal to 100% external/0% internal, preferably 60% external/40% internal to 90% external/10% internal.

The FIGURE shows a flow scheme of the present invention. A net gas stream 12 is sent from a catalytic reformer 10. Net gas stream 12 is compressed in compressor 14 and then after passing through chiller 16, compressed stream 18 has a temperature of about 60F before entering pressure swing adsorption unit 20. A stream 22, that is depleted in hydrogen, is sent to compressor 24 with the resulting compressed stream 27 used as fuel gas or otherwise exiting the system. A purified hydrogen stream 28 exits the PSA unit 20 with most of hydrogen stream 28 being compressed by compressors 48 and 50 and then being used in hydrocracker 52. From hydrocracker 52 is sent a LP flash gas stream 54 that goes to a temperature swing adsorption unit to remove impurities including water, hydrogen sulfide and ammonia with a purified LP gas stream being sent to a membrane unit 62 to be separated into a permeate stream 66 and a non-permeate stream 64. Permeate stream 66 is an external purge stream that is sent to the pressure swing adsorption unit 20. Non-permeate stream 64 is cooled in chiller 68 to about 45 F and separated into liquid stream 74 and vapor stream 73. Liquid stream 74 is sent to the fractionation section in hydrocracker 52 or catalytic reformer 10 for recovery of LPG and light naphtha. Vapor stream 73 is split into fuel-gas stream 26 and regeneration gas stream 76 for the TSA unit. Regeneration gas stream 58 from the TSA unit containing removed water and impurities is sent to fuel header.

EXAMPLE

In order to demonstrate advantages of the invention, a process simulation model (including a detailed PSA model)

was used to determine the hydrogen balance of a hydrocracking complex. As indicated in Table 2, use of the hydrocracker flash gas as external purge in the PSA unit improves hydrogen recovery from catalytic reformer net gas from 92.1% to 96.0%. This increases PSA product hydrogen from 127 to 132 mmscfd, resulting in lower hydrogen import requirements and significant cost savings. In addition to purchased hydrogen import savings, Table 2 shows that significant value is obtained from LPG and light naphtha recovery from the membrane non-permeate stream.

TABLE 2

|  | PSA Only | PSA + TSA + Membrane (according to invention) |
|---|---|---|
| PSA Feed Pressure, psig | 650 | 650 |
| Relative PSA Bed Volume | 1.0 | 0.6 |
| PSA Feed Flow, mmscfd | 150 | 150 |
| Membrane Feed Flow, mmscfd | — | 6.8 |
| H2 Recovery from PSA Feed, % | 92.1 | 96.0 |
| PSA H2 Product Flow, mmscfd | 127 | 132 |
| LPG Product, barrels per day | — | 180 |
| Light Naphtha Product, barrels per day | — | 78 |

SPECIFIC EMBODIMENTS

While the following is described in conjunction with specific embodiments, it will be understood that this description is intended to illustrate and not limit the scope of the preceding description and the appended claims.

A first embodiment of the invention is a process for producing hydrogen for a hydrogen consuming process comprising (a) obtaining a net gas stream containing hydrogen; (b) compressing the gas stream to a pressure of about 20.7 to 68.9 bar (300 to 1000 psig) to produce a compressed gas stream; (c) sending the compressed gas stream to a pressure swing adsorption unit to be separated into a hydrogen stream and a fuel gas stream; (d) purging the pressure swing adsorption unit with an external purge gas stream from a hydroprocessing unit off gas; (e) treating the external purge gas stream with a thermal swing adsorption unit to remove water and other impurities prior to purging the pressure swing adsorption unit; and (f) using a protective adsorbent layer in the pressure swing adsorption unit at the product-hydrogen end (top) of the bed to adsorb impurities from the external purge gas. An embodiment of the invention is one, any or all of prior embodiments in this paragraph up through the first embodiment in this paragraph wherein the external purge gas stream is a flash gas stream from a hydrocracking reactor. An embodiment of the invention is one, any or all of prior embodiments in this paragraph up through the first embodiment in this paragraph wherein the external purge gas stream is a flash gas stream from a hydrotreating reactor. An embodiment of the invention is one, any or all of prior embodiments in this paragraph up through the first embodiment in this paragraph wherein the net gas stream is from a catalytic reforming reactor. An embodiment of the invention is one, any or all of prior embodiments in this paragraph up through the first embodiment in this paragraph wherein the external purge gas stream is at a pressure of about 35 to 276 kPa (5 psig to 40 psig) when entering the pressure swing adsorption unit. An embodiment of the invention is one, any or all of prior embodiments in this paragraph up through the first embodiment in this paragraph wherein the external purge gas stream is mixed with an internal purge gas stream obtained from de-pressurizing a bed in the pressure swing adsorption unit. An embodiment of the invention is one, any or all of prior embodiments in this paragraph up through the first embodiment in this paragraph wherein the flow rate of the external purge gas stream is measured and the internal purge gas stream is adjusted to obtain a desired total purge gas flow. An embodiment of the invention is one, any or all of prior embodiments in this paragraph up through the first embodiment in this paragraph wherein the ratio of external to internal purge flows is about 4060 to 1000, preferably 6040 to 9010. An embodiment of the invention is one, any or all of prior embodiments in this paragraph up through the first embodiment in this paragraph wherein the hydrogen is sent to one or more reactors selected from the group consisting of a hydrocracking reactor, a hydrotreating reactor an aromatics conversion reactor, and an isomerization reactor. An embodiment of the invention is one, any or all of prior embodiments in this paragraph up through the first embodiment in this paragraph wherein the treated purge gas stream is sent through a membrane unit to produce a non-permeate stream depleted in hydrogen and a permeate hydrogen stream to be sent as the external purge gas stream through the pressure swing adsorption unit. An embodiment of the invention is one, any or all of prior embodiments in this paragraph up through the first embodiment in this paragraph wherein the treated purge gas stream is at a pressure of about 13.8 to 41.4 bar (200 to 600 psig). An embodiment of the invention is one, any or all of prior embodiments in this paragraph up through the first embodiment in this paragraph wherein the temperature swing adsorption unit is regenerated with a gas stream from the non-permeate stream. An embodiment of the invention is one, any or all of prior embodiments in this paragraph up through the first embodiment in this paragraph wherein the protective adsorbent layer comprises from about 5% to 25% of the pressure swing adsorption unit bed volume. An embodiment of the invention is one, any or all of prior embodiments in this paragraph up through the first embodiment in this paragraph wherein the protective adsorbent layer is comprised of silica gel. An embodiment of the invention is one, any or all of prior embodiments in this paragraph up through the first embodiment in this paragraph wherein the protective adsorbent layer is comprised of activated alumina. An embodiment of the invention is one, any or all of prior embodiments in this paragraph up through the first embodiment in this paragraph wherein the non-permeate stream is chilled to about 0° to 20° C. to produce a liquid hydrocarbon stream. An embodiment of the invention is one, any or all of prior embodiments in this paragraph up through the first embodiment in this paragraph wherein the liquid stream is sent to fractionation section of a hydroprocessing unit to recover liquefied petroleum gas and light naphtha. An embodiment of the invention is one, any or all of prior embodiments in this paragraph up through the first embodiment in this paragraph wherein the liquid stream is sent to fractionation section of a catalytic reforming unit to recovery liquefied petroleum gas and light naphtha.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing hydrogen for a hydrogen consuming process comprising:
   (a) obtaining a net gas stream containing hydrogen;
   (b) compressing said gas stream to a pressure of about 20.7 to 68.9 bar (300 to 1000 psig) to produce a compressed gas stream;
   (c) sending the compressed gas stream to a pressure swing adsorption unit to be separated into a hydrogen stream and a fuel gas stream;
   (d) purging said pressure swing adsorption unit with an external purge gas stream, wherein said external purge gas stream is mixed with an internal purge gas stream obtained from de-pressurizing a bed in the pressure swing adsorption unit, wherein the flow rate of said external purge gas stream is measured and said internal purge gas stream is adjusted to obtain a desired total purge gas flow;
   (e) treating said off gas with a thermal swing adsorption unit to remove water and other impurities prior to purging said pressure swing adsorption unit; and
   (f) using a protective adsorbent layer in said pressure swing adsorption unit at the product-hydrogen end (top) of the bed to adsorb impurities from said external purge gas, and
   wherein the ratio of external to internal purge flows is from about 40:60 to 100:0.

2. The process of claim 1 wherein said external purge gas stream is a flash gas stream from a hydrocracking reactor.

3. The process of claim 1 wherein said external purge gas stream is a flash gas stream from a hydrotreating reactor.

4. The process of claim 1 wherein said net gas stream is from a catalytic reforming reactor.

5. The process of claim 1 wherein said external purge gas stream is at a pressure of about 35 to 276 kPa (5 psig to 40 psig) when entering said pressure swing adsorption unit.

6. The process of claim 1 wherein the ratio of external to internal purge flows is about 60:40 to 90:10.

7. The process of claim 1 wherein said hydrogen is sent to one or more reactors selected from the group consisting of a hydrocracking reactor, a hydrotreating reactor an aromatics conversion reactor, and an isomerization reactor.

8. The process of claim 1 wherein said treated purge gas stream is sent through a membrane unit to produce a non-permeate stream depleted in hydrogen and a permeate hydrogen stream to be sent as said external purge gas stream through said pressure swing adsorption unit.

9. The process of claim 1 wherein said treated purge gas stream is at a pressure of about 13.8 to 41.4 bar (200 to 600 psig).

10. The process of claim 1 wherein said temperature swing adsorption unit is regenerated with a gas stream from said non-permeate stream.

11. The process of claim 1 wherein said protective adsorbent layer comprises from about 5% to 25% of said pressure swing adsorption unit bed volume.

12. The process of claim 1 wherein said protective adsorbent layer is comprised of silica gel.

13. The process of claim 1 wherein said protective adsorbent layer is comprised of activated alumina.

14. The process of claim 7 wherein said non-permeate stream is chilled to about 0° to 20° C. to produce a liquid hydrocarbon stream.

15. The process of claim 14 wherein said liquid stream is sent to fractionation section of a hydroprocessing unit to recover liquefied petroleum gas and light naphtha.

16. The process of claim 14 wherein said liquid stream is sent to fractionation section of a catalytic reforming unit to recovery liquefied petroleum gas and light naphtha.

* * * * *